United States Patent
McCline et al.

(10) Patent No.: US 9,087,115 B1
(45) Date of Patent: *Jul. 21, 2015

(54) MIRROR RESYNCHNRONIZATION OF FIXED PAGE LENGTH TABLES FOR BETTER REPAIR TIME TO HIGH AVAILABILITY IN DATABASES

(71) Applicant: Pivotal Software, Inc., Palo Alto, CA (US)

(72) Inventors: Matthew C. McCline, Foster City, CA (US); Milena Bergant, San Mateo, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,794

(22) Filed: Jul. 24, 2014

Related U.S. Application Data

(63) Continuation of application No. 13/107,900, filed on May 14, 2011, now Pat. No. 8,818,943.

(51) Int. Cl.
G06F 17/30 (2006.01)

(52) U.S. Cl.
CPC .............................. *G06F 17/30581* (2013.01)

(58) Field of Classification Search
CPC ......................... G06F 2201/84; G06F 11/1471
USPC ......................................................... 707/624
See application file for complete search history.

(56) References Cited

U.S. PATENT DOCUMENTS

2004/0267809 A1* 12/2004 East et al. .................. 707/104.1
2007/0055836 A1 3/2007 Yamato et al.

* cited by examiner

*Primary Examiner* — Rehana Perveen
*Assistant Examiner* — Alexander Khong
(74) *Attorney, Agent, or Firm* — Fish & Richardson P.C.

(57) ABSTRACT

In a mirrored database system, mirror resynchronization of fixed length pages is optimized for quick repair and high availability by identifying those lost page changes that must be made for resynchronization and ignoring other duplicate changes. Essential pages are identified using log sequence numbers (LSNs) to locate the most current version of a changed page, and other lower valued LSNs of less current versions of that page are eliminated as having changes that are duplicated in the current version of the page. Page changes since the last database checkpoint before losing mirror synchronization and the current LSN of the transaction log are identified as possibly necessary changes to be made.

18 Claims, 6 Drawing Sheets

MIRROR RESYNCHNRONIZATION OF FIXED PAGE LENGTH TABLES FOR BETTER REPAIR TIME TO HIGH AVAILABILITY IN DATABASES

BACKGROUND

This invention relates generally to mirrored databases used for online transaction processing (OLTP), and more particularly to the resynchronization of fixed page length tables on a mirror database.

Enterprises employ database systems comprising mirrored databases as a repository of the enterprise's stored data, and to support operational systems such as online transaction processing (OLTP). The databases generally have large sizes, store large volumes of data in fixed sized page length tables, and experience high numbers of online transactions that continually change existing pages and create new pages.

Mirrored databases comprise a primary database and a mirror database pair that are synchronized by redundantly writing the same data to both databases for backup and to assure high availability of the data if one of the databases fails (crashes). In the event of a crash, or loss of communications with a database, a mirror resynchronization process must be performed by the system to catch up lost changes on the mirror and new changes resulting from new online transactions while the mirror was down in order to restore the databases to a synchronized state. An important measure of database service availability is the time it takes for a mirror database to take over processing once a failure of the primary database has been detected. This time is referred to as the mean-time-to-repair (MTTR). Accordingly, it is important that resynchronization be performed timely so that the database has a very good repair-time to high-availability.

A problem for mirrored databases supporting OLTP is that mirror resynchronization can suffer from the chase-the-tail problem of trying to read and apply changes due to new ongoing online transactions at the same time the database is trying to mirror resynchronize, while falling behind an ever-increasing EOF (End of File) change tracking log that records changes due to new online transactions. The result is an inability to mirror resynchronize in a timely manner, which adversely affects high availability.

It is desirable to provide systems and methods that address these and other problems of timely resynchronization of mirrored databases while accommodating changes due to new online transactions to afford good repair time and high availability, and it is to these ends that the present invention is directed.

DESCRIPTION OF PREFERRED EMBODIMENTS

The invention is particularly well adapted for re-synchronizing mirrored database pairs comprising a primary database and a mirror database which store the same data in fixed page length tables, and will be described in that context. As will be appreciated, however, this is illustrative of only one utility of the invention.

Figure 1:
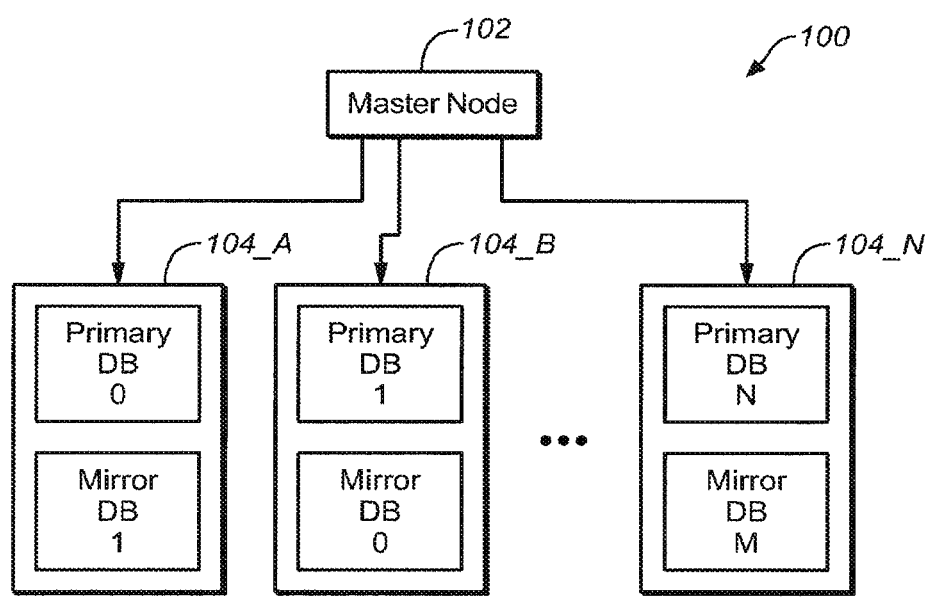
FIG. 1 is a block diagram that illustrates a known network architecture of a logical database cluster in which the invention may be employed.

FIG. 1 illustrates a shared-nothing network architecture of a logical database cluster 100 with which the invention may be employed. The network may include a master node 102 which internally connects to a plurality of shared-nothing nodes 104-A through 104-N. Each node may comprise a plurality of database (DB) segments (database instances) including one or more primary databases and one or more mirror databases. As indicated in the figure, for fault tolerance purposes, a primary database and its corresponding mirror database are located on different nodes. Node 104-A may contain, for example, Primary DB 0 and Mirror DB 1, whereas node 104-B may contain Primary DB 1 and Mirror DB 0. Thus, mirroring Primary DB 0 on node 104-A requires that primary data be written to Mirror DB 0 on node 104-B. Database systems such as illustrated in FIG. 1 may be used as a repository of an enterprise's digital stored data and to provide an architecture for data flow to support operational systems such as online transaction processing (OLTP).

Figure 2:
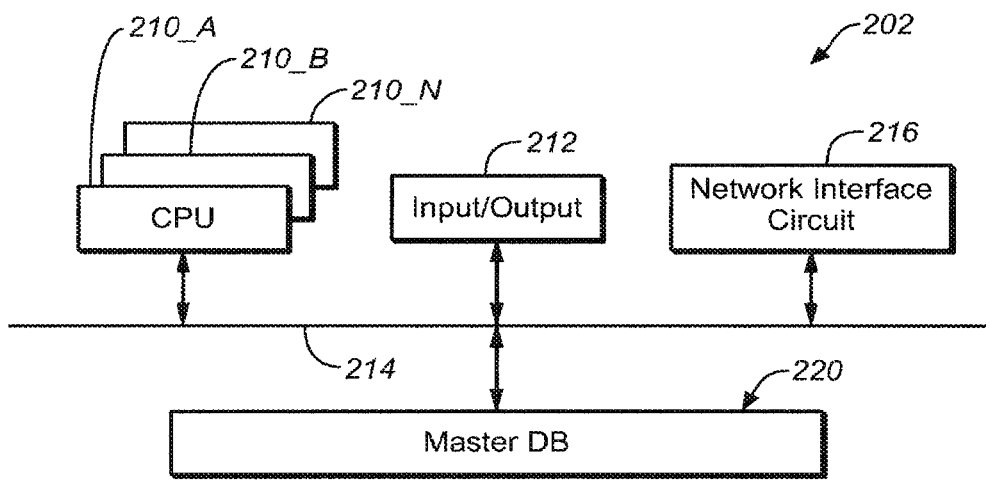
FIG. 2 is a block diagram of a master node of the network of FIG. 1 that may be configured to operate in accordance with an embodiment of the invention.

FIG. 2 illustrates a master node 202 configured to implement operations in accordance with the invention. The method node may comprise a plurality of host CPUs 210-A through 210-N connected to input/output (I/O) Devices 212 by a bus 214. The I/O devices may be primarily disk storage, and may also comprise standard computer system input and output devices. A network interface circuit 216 may also be connected to bus 214 to allow the master node to operate in a networked environment. The master node may also have a memory 220 connected to the bus that embodies executable instructions to control the operation of the host computer system of the node and to perform processes in accordance with the invention. Included in memory 220 is a master database instance to which users connect.

Figure 3:
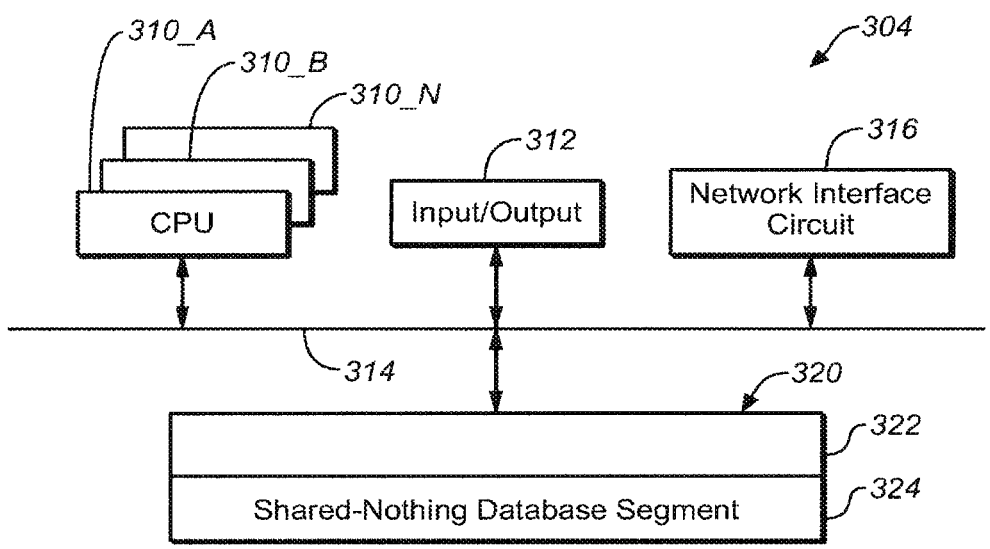
FIG. 3 is a block diagram of a node of the network of FIG. 1 that may be configured to operate in accordance with an embodiment of the invention.

FIG. 3 illustrates a shared-nothing node 304 configured to implement operations in accordance with the invention. Node 304 may have a similar architecture to master node 202, comprising a plurality of host CPUs 310-A through 310-N connected to a bus 314. A set of input/output devices 312, a network interface circuit 316 to afford network connectivity, and a memory 320 may also be connected to the bus. Memory 320 may comprise a first array portion 322 containing data and executable instructions to implement the processes of the invention, and may include one or more shared-nothing database segments 324. The database segments 324 may comprise primary and mirror DB instances.

Figure 4:
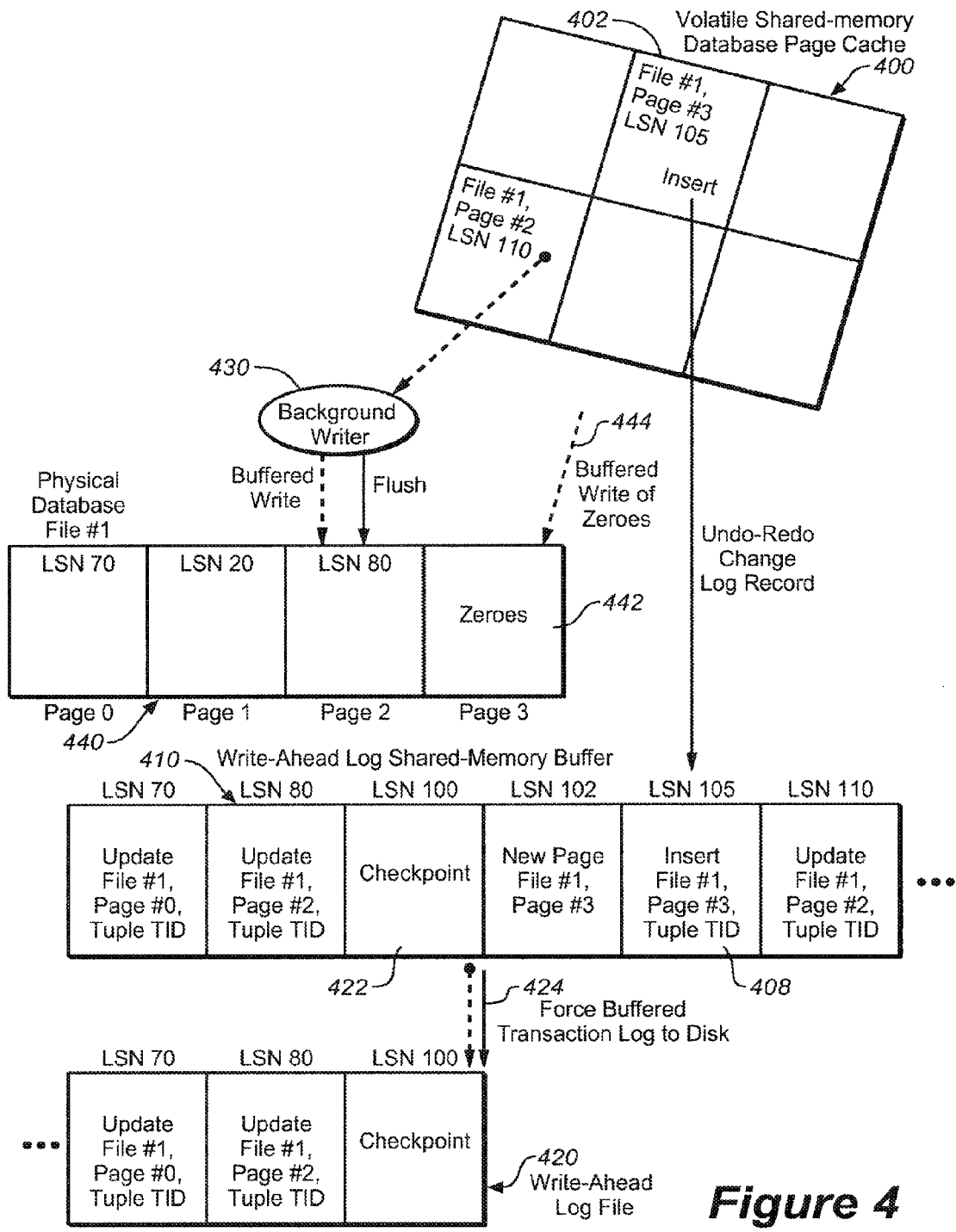
FIG. 4 illustrates a conventional process by which transactions change existing pages and create new pages in a database and the database components involved.

FIG. 4 is a brief overview of a conventional process by which changes to pages in a database are made by transactions and the database system components involved in the changes. This conventional process will be briefly described to provide background and context for a better understanding of the invention.

Referring to FIG. 4, the database system includes a volatile shared memory database page cache 400 comprising fixed length database pages. The fixed length pages typically have a size of 32 Kbytes and have records containing a header that includes a page number and a sequentially assigned log sequence number (LSN). When a transaction in a transaction session makes changes to a page, e.g., Page #3, 402, an INSERT makes the changes to the page in the shared memory database page cache 400, and an undo-redo change log record is generated and written at 408 to a write-ahead-log (WAL) shared memory buffer 410. The record includes the page number (Page #3), and the page LSN, e.g. LSN 105. At certain times, such as when the buffer 410 is full, it is force written to a write-ahead-log (WAL) file 420 on disk. Additionally, checkpoints occurring at periodic intervals, such as the checkpoint 422 at LSN 100, are used to push changed database pages in the shared memory buffer to the WAL file on disk, as indicated at 424. The standard WAL protocol requires that all log records that describe changes to a page be written to a transaction log (WAL) in advance of the page being flushed to disk. Since database page writes can be very inefficient because only a small portion of a page may have been changed but the whole block must be written, it is desirable to delay and combine page writes by recording all changes sequentially in the transaction log up to the point, e.g., checkpoint 422, LSN 100, that the buffer is flushed to the WAL on disk.

Upon the buffer 410 being flushed to disk at 424, as at periodic checkpoint 422 or a COMMIT, a background writer 430 will issue buffered writes of dirty (changed) pages in the shared memory database page cache 400 to the physical database 440. A new database page 442 may be written to the physical database 440 initially with zeros as part of a NEW PAGE transaction log record operation in order to establish a known state for the page by issuing a buffered write of zeros at 444 to the database. Additionally, the conventional force-log-at-commit protocol requires that changes made by a transaction be described properly on disk in the transaction log (WAL log) before the transaction commits. Accordingly, upon a transaction COMMIT, the background writer 430 will buffer write changes to the appropriate page in the database 440. When the background writer issues a buffered write for a cache page, the page is then clean. Clean pages may be evicted from the cache. Conventionally, the background writer will progressively work through all pages in the shared memory database page cache and issue buffered writes of dirty pages to the file system in advance of a periodic checkpoint. This is desirable to enable the file system to optimally schedule physical disk writes. A page in the physical database can be current where there are no new changes described in the transaction log that have not been written to the page, and a database page may be missing changes recently recorded in the transaction log.

Figure 5:
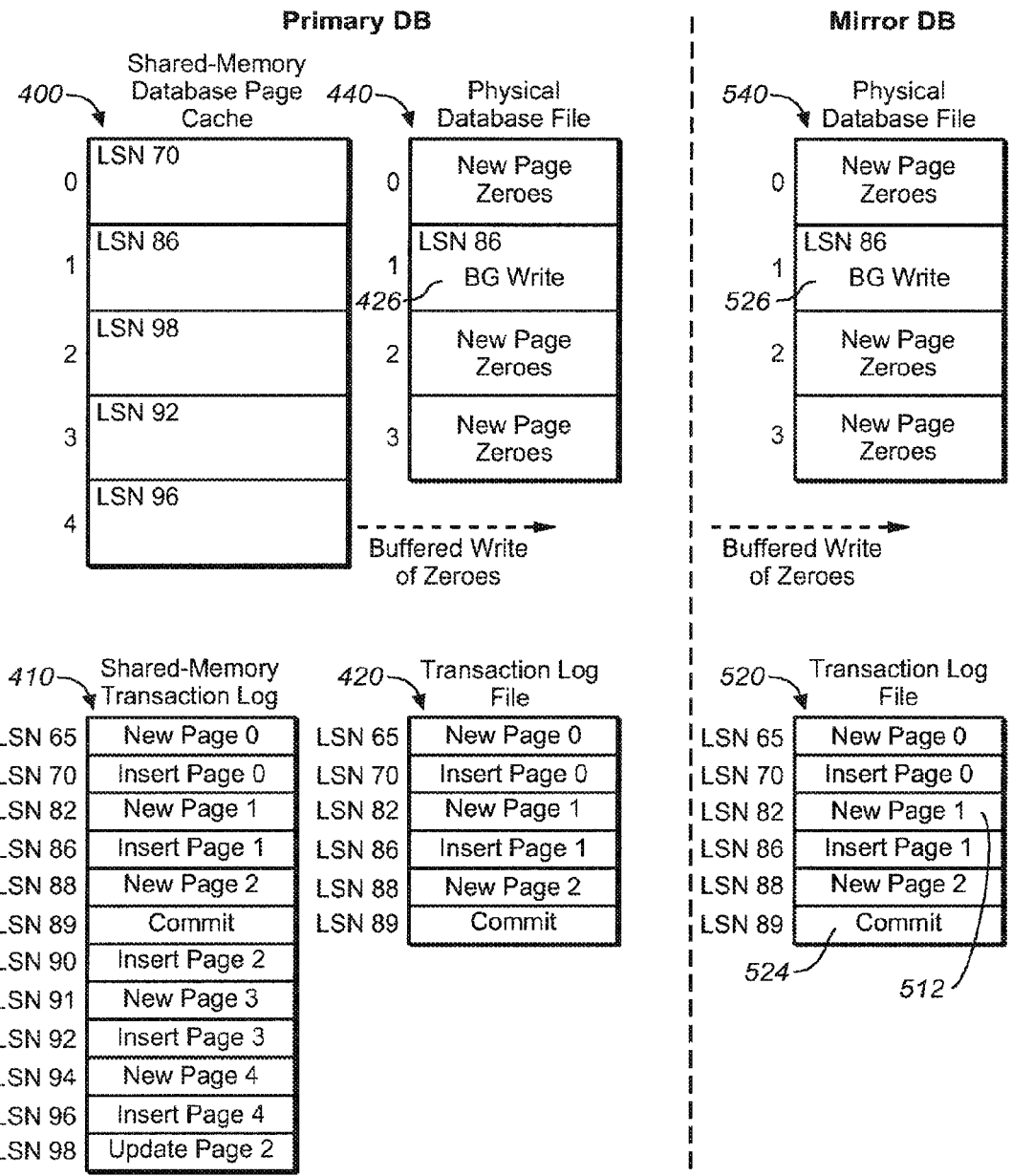
FIG. 5 illustrates a process in accordance with an embodiment of the invention for inserting new records into pages and creating new pages in synchronized primary and mirror databases.

FIG. 5 illustrates a process in accordance with an embodiment of the invention for creating new pages and inserting new records into pages in synchronized primary and mirror databases. As indicated in FIG. 5, loads may have occurred that created new pages, such as Page 0 (LSN 65), Page 1 (LSN 82), and Page 2 (LSN 88), and inserted new records for the Page 0 (LSN 70) and Page 1 (LSN 86) in the shared memory transaction log buffer 410. A COMMIT at LSN 89 forces out the portion of the buffer 410 between the new Page 0 (LSN 65) record down through the COMMIT (LSN 89) to the transaction log file 420 on disk, as shown. Corresponding writes will also be made to the transaction log file 520 in the mirror database. Upon the background writer locating the dirty Page 1 (LSN 86), it issues a buffered write at 426 to write the page to the primary database 440. A buffered write will also be issued to write the page at 526 to the mirror database 540. Subsequently, the background writer will locate the other pages and issue buffered writes for them also.

In the event of a takeover by the mirror database, the mirror database has the data in the transaction log 520 comprising the transactions through the COMMIT 524 (LSN 89). In a takeover, the mirror database will run crash recovery by reading the transaction log 520 through record 524 and apply the changes to its database 540 to catch up.

The invention affords efficiently and timely handling of a mirror resynchronization process in a mirrored database, whereby only those lost page changes to fixed length pages in a mirror database that are necessary for resynchronization are identified and made to the mirror database and duplicate page changes on less current pages are ignored in order to afford very good repair time and high-availability, while concurrently handling new changes to database pages resulting from new ongoing online transactions. As will be described, this is accomplished by avoiding the necessity of having to scan through large amounts of data upon a crash to find changes by quickly identifying only the lost page changes necessary for resynchronization and ignoring other changes, and by making only these necessary changes. This minimizes the time required to identify and make required changes, eliminates unnecessary changes, and optimizes resynchronization. Furthermore, the process handles new changes to pages due to ongoing online transactions during resynchronization in parallel with the mirror resynchronization catch up process. It does not send data changed after mirror resynchronization started since that data will be written mirrored as a result of the online transactions.

In accordance with one embodiment, the invention quickly and efficiently determines, upon mirror synchronization being lost, the lost changes to fixed length page tables that must be handled by crash recovery during mirror resynchronization by using LSNs. Generally, if crash recovery finds a change to a page in a transaction log with a LSN higher than a given page's LSN, it applies the change to the page.

Figure 6:
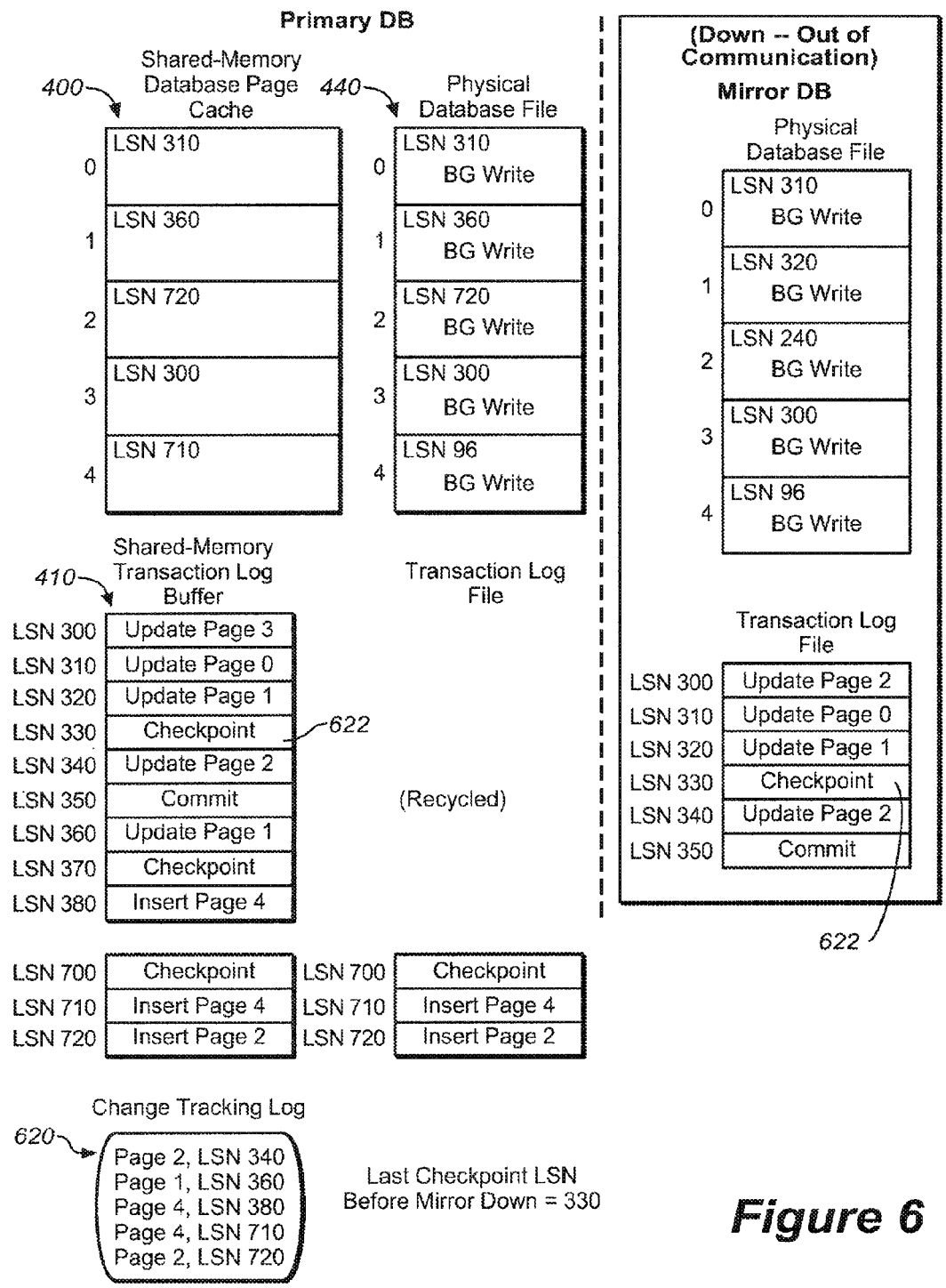
FIG. 6 illustrates a first phase of a mirror resynchronization process in accordance with an embodiment of the invention for determining the states of changes to primary and mirror database pages upon a mirror database going down.

FIG. 6 illustrates a first phase of a mirror resynchronization process in accordance with an embodiment of the invention which efficiently determines the lost changes to primary database pages in a mirrored database pair upon a mirror database going down. Those lost page changes necessary for mirror resynchronization are then identified. At the point where mirror synchronization is lost, changes to fixed length page tables may be filtered from the transaction log to a change tracking log 620 which may capture metadata of all write-related changes from the transaction log. The metadata information may comprise the page relation identity, page number and LSN. The change tracking log is described in more detail in co-pending U.S. application Ser. No. 13/077,935, filed 31 Mar. 2011 and assigned the assignee the present invention, the disclosure of which is Incorporated by reference herein. Not all write-related changes are necessary for mirror resynchronization. A mirror resynchronization process in accordance with one embodiment quickly identifies which changes are necessary and discards others, as will be described.

In accordance with one embodiment, a mirror resynchronization process captures certain information at the beginning of the mirror resynchronization process. First, it captures the oldest possible page LSN which the background writer had not flushed to the mirrored pair of disks at the time mirror synchronization was lost. It does this by obtaining the LSN of the last database checkpoint, i.e., the point at which all data was flushed to disk, prior to mirror synchronization being lost. The process next captures the current LSN of the transaction log, turns the change tracking log off, sorts the change tracking data on table relation path and page number, and eliminates duplicate page changes. If a current table has a page with an LSN between the two captured LSNs it is a "lost" page that the mirror may require for resynchronization. Lost pages may be recorded as entries in the change tracking log.

As an example shown in FIG. 6, the LSN of the last checkpoint 622 received by the mirror database before communication was lost is LSN 330. All database pages with changes up to LSN 330 were already flushed to the mirror database prior to loss of synchronization. The change tracking log 620 captures the page number and LSN of all transaction log entries for page changes since database checkpoint 622 (LSN 330). These include, as shown, change entries to Page 2 (LSN 340), to Page 1 (LSN 360), to Page 4 (LSN 380), to Page 4 (LSN 710) and to Page 2 (LSN 720).

Figure 7:
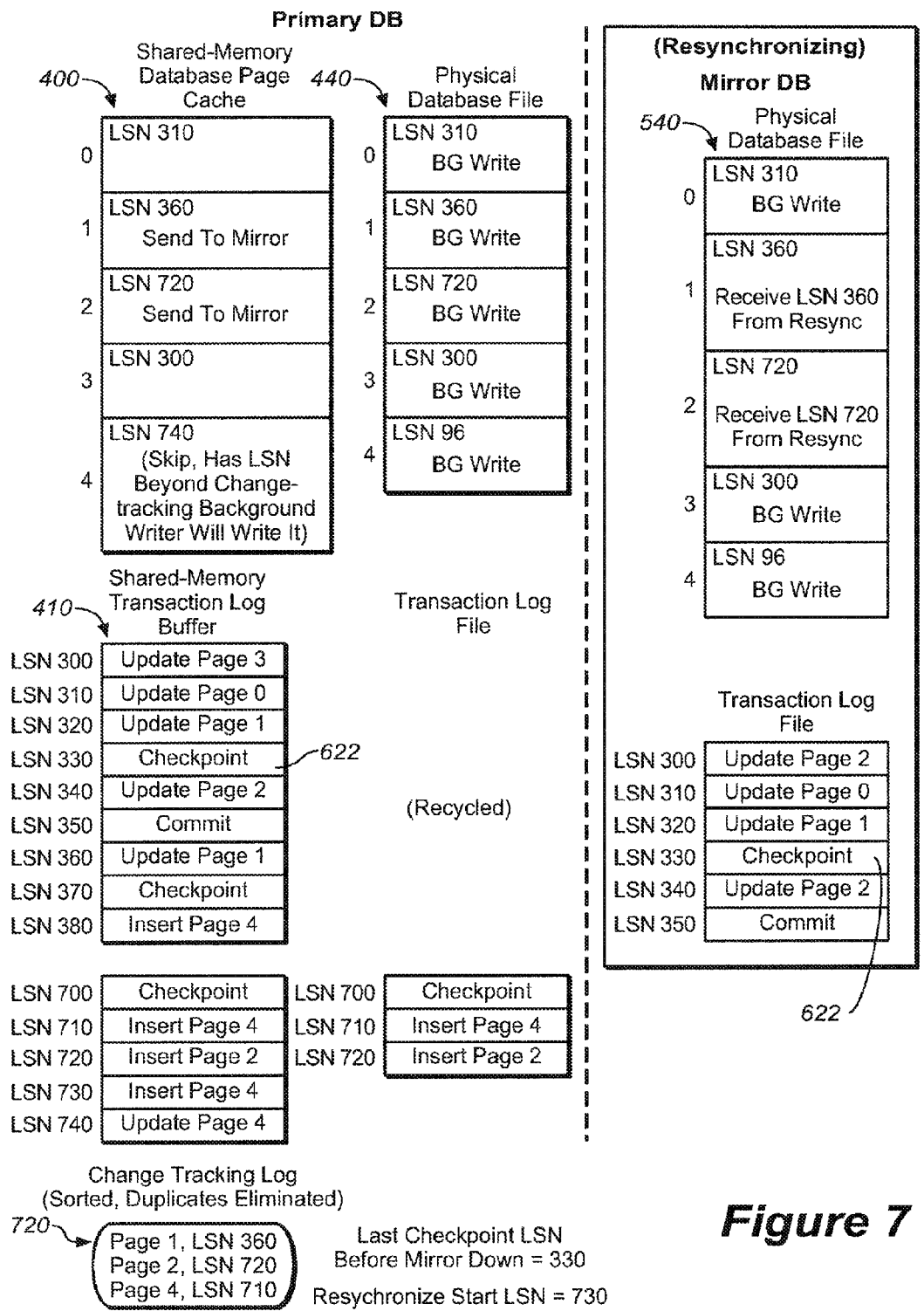
FIG. 7 illustrates a second phase of the mirror resynchronization process in accordance with an embodiment of the invention for efficiently identifying the required lost changes to fixed length pages and re-synchronizing the mirror to minimize repair time and afford high availability.

FIG. 7 illustrates a second phase of the mirror resynchronization process that identifies and resynchronizes the mirror by making only the lost data changes necessary for resynchronization. After capturing the change tracking data, the process next captures the current LSN 730 of the transaction log at the start of mirror resynchronization, and turns off the change tracking log as described. It then sorts the change tracking data on page number and eliminates duplicate changes by eliminating lower LSN values of a page. The maximum LSN value for a version of a given page is retained since that page version will have the latest changes and will be current. Page changes on entries for versions of that page having lower LSN values will have been incorporated in latest (current) version of the page. They are duplicates that are unnecessary and can be eliminated.

If a current table has a page with a LSN between the two captured LSNs, it is a "lost" page change that the mirror database needs. These lost page changes correspond to recorded entries in the change tracking log. Mirror resynchronization uses the sorted entries in the change tracking log to determine which changes must be applied to the mirror database during resynchronization. Since the change tracking log was turned off, new transactions will not be added to the change tracking log, and mirror resynchronization will not be chasing the tail of the change tracking log as new online transactions make additional changes to pages.

For each sorted change tracking entry, the primary table's page is read into the shared memory database page cache which is used as a central point of control for that page since it can be momentarily locked while the mirror resynchronization process checks the page's LSN page and the page data sent to the mirror database, if necessary. If the page LSN is greater than the captured transaction log LSN, the page was changed by a new online transaction and will be written to the mirror database on behalf of that transaction. Accordingly, it does not need to be re-synchronized. This avoids the necessity of sending pages to the mirror for resynchronization that are already going to be written during the normal synchronization process, and optimizes mirror resynchronization. Otherwise, mirror resynchronize will send the page to the mirror for writing.

As shown in the sorted change tracking log 720 in FIG. 7, only three of the five pages listed in the change tracking log 620 survived sorting. These are Page 1 (LSN 360), Page 2 (LSN 720) and Page 4 (LSN 710). Pages having lower LSNs that were eliminated from the sorted log are Page 2 (LSN 340) and Page 4 (LSN 380). The changes to these lower LSN pages are included in the higher LSNs for these pages, as explained above. Page 1, LSN 360 will be sent by the primary database to be written to the mirror database since its transaction log was already written to the mirror. The changes to Pages 2 and 4 will be handled by normal synchronization. When the mirror resynchronize process has finished applying changes, it may request a database checkpoint which flushes all resynchronized changes to the mirror disk.

As may be appreciated from the foregoing, the invention optimizes mirror resynchronization to afford a good repair time and high availability by quickly identifying only the pages changes which were not written to the mirror database prior to the mirror database going down and have no subsequent changes due to ongoing online transactions. It sends these pages to be written to the mirror during mirror resynchronization. Normal online transaction processing is given the responsibility of handling new changes during the normal synchronization processes so that these changes do not continually add additional work to the mirror resynchronization process.

An embodiment of the invention affords a computer storage product comprising a computer readable storage medium storing executable computer instructions for controlling the operations of computer systems to perform the processing operations described herein. The computer readable medium may be any standard media well known and available to those skilled in the art, including, but not limited to magnetic media such as hard disks, floppy disks, magnetic tape; optical media such as CD-ROMs, DVDs, holographic devices; magneto-optical media; and hardware devices configured to store and execute program code, such as application-specific integrated circuits (ASICs), programmable logic devices and ROM and RAM devices.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method of mirror resynchronization of pages in a mirrored pair of databases comprising a primary database and a mirror database, the method comprising:
writing, for each page change of a plurality of page changes to the pages, a record of the page change to a transaction log buffer, wherein each record includes a log sequence number (LSN);
maintaining a record of a greatest checkpoint LSN, the greatest checkpoint LSN being the greatest LSN of the LSNs of records from the transaction log buffer written to a primary transaction log file for the primary database and a mirror transaction log file for the mirror database;
upon a loss of mirror synchronization and until a starting of mirror resynchronization, capturing, in a change tracking log, page changes written to the transaction log buffer with an LSN greater than the greatest checkpoint LSN, while continuing writing a record of page changes to the transaction log buffer; and
after the starting of mirror resynchronization:
determining, for each page referenced by a page change in the change tracking log, a most recent page change for that page captured in the change tracking log, and updating the mirror database using the most recent page changes in the change tracking log for each page referenced by a page change in the change tracking log.

2. The method of claim 1, wherein continuing writing a record of page changes to the transaction log buffer comprises writing the record in parallel with updating the mirror database.

3. The method of claim 1, wherein capturing page changes in the change tracking log comprises recording page numbers and log sequence numbers (LSNs) of new and changed pages into the change tracking log.

4. The method of claim 3, wherein determining the most recent page changes for each page referenced by a page change in the change tracking log comprises sorting the page changes in the change tracking log by page number.

5. The method of claim 3, wherein determining the most recent page changes for each page referenced by a page change in the change tracking log comprises finding, for each page referenced by a page change in the change tracking log, the page change having a largest LSN of the page changes referencing the page.

6. The method of claim 1, further comprising flushing each resynchronized page change of a plurality of resynchronized page changes to the mirror database upon finishing mirror resynchronization.

7. A system for mirror resynchronization of pages in a mirrored pair of databases comprising a primary database and a mirror database, the system comprising:
  one or more computers and one or more storage devices storing instructions that are operable, when executed by the one or more computers, to cause the one or more computers to perform operations comprising:
    writing, for each page change of a plurality of page changes to the pages, a record of the page change to a transaction log buffer, wherein each record includes a log sequence number (LSN);
    maintaining a record of a greatest checkpoint LSN, the greatest checkpoint LSN being the greatest LSN of the LSNs of records from the transaction log buffer written to a primary transaction log file for the primary database and a mirror transaction log file for the mirror database;
    upon a loss of mirror synchronization and until a starting of mirror resynchronization, capturing, in a change tracking log, page changes written to the transaction log buffer with an LSN greater than the greatest checkpoint LSN, while continuing writing a record of page changes to the transaction log buffer; and
    after the starting of mirror resynchronization:
      determining, for each page referenced by a page change in the change tracking log, a most recent page change for that page captured in the change tracking log, and
      updating the mirror database using the most recent page changes in the change tracking log for each page referenced by a page change in the change tracking log.

8. The system of claim 7, wherein continuing writing a record of page changes to the transaction log buffer comprises writing the record in parallel with updating the mirror database.

9. The system of claim 7, wherein capturing page changes in the change tracking log comprises recording page numbers and log sequence numbers (LSNs) of new and changed pages into the change tracking log.

10. The system of claim 9, wherein determining the most recent page changes for each page referenced by a page change in the change tracking log comprises sorting the page changes in the change tracking log by page number.

11. The system of claim 9, wherein determining the most recent page changes for each page referenced by a page change in the change tracking log comprises finding, for each page referenced by a page change in the change tracking log, the page change having a largest LSN of the page changes referencing the page.

12. The system of claim 7, the operations further comprising flushing each resynchronized page change of a plurality of resynchronized page changes to the mirror database upon finishing mirror resynchronization.

13. A non-transitory computer readable storage medium comprising executable instructions for controlling the operation of a computer system to perform mirror resynchronization of fixed length pages in a mirrored pair of databases comprising a primary database and a mirror database supporting transactions, comprising instructions to perform operations:
  writing, for each page change of a plurality of page changes to the pages, a record of the page change to a transaction log buffer, wherein each record includes a log sequence number (LSN);
  maintaining a record of a greatest checkpoint LSN, the greatest checkpoint LSN being the greatest LSN of the LSNs of records from transaction log buffer written to a primary transaction log file for the primary database and a mirror transaction log file for the mirror database;
  upon a loss of mirror synchronization and until a starting of mirror resynchronization, capturing, in a change tracking log, page changes written to the transaction log buffer with an LSN greater than the greatest checkpoint LSN, while continuing writing a record of page changes to the transaction log buffer; and
  after the starting of mirror resynchronization:
    determining, for each page referenced by a page change in the change tracking log, a most recent page change for that page captured in the change tracking log, and
    updating the mirror database using the most recent page changes in the change tracking log for each page referenced by a page change in the change tracking log.

14. The non-transitory computer readable storage medium of claim 13, wherein continuing writing a record of page changes to the transaction log buffer comprises writing the record in parallel with updating the mirror database.

15. The non-transitory computer readable storage medium of claim 13, wherein capturing page changes in the change tracking log comprises recording page numbers and log sequence numbers (LSNs) of new and changed pages into the change tracking log.

16. The non-transitory computer readable storage medium of claim 15, wherein determining the most recent page changes for each page referenced by a page change in the change tracking log comprises sorting the page changes in the change tracking log by page number.

17. The non-transitory computer readable storage medium of claim 15, wherein determining the most recent page changes for each page referenced by a page change in the change tracking log comprises finding, for each page referenced by a page change in the change tracking log, the page change having a largest LSN of the page changes referencing the page.

18. The non-transitory computer readable storage medium of claim 13, the operations further comprising flushing each resynchronized page change of a plurality of resynchronized page changes to the mirror database upon finishing mirror resynchronization.

\* \* \* \* \*

UNITED STATES PATENT AND TRADEMARK OFFICE
CERTIFICATE OF CORRECTION

PATENT NO.        : 9,087,115 B1
APPLICATION NO.   : 14/339794
DATED             : July 21, 2015
INVENTOR(S)       : McCline et al.

Page 1 of 1

It is certified that error appears in the above-identified patent and that said Letters Patent is hereby corrected as shown below:

On the title page, item [54] and in the specification, Column 1, Line 1: delete "RESYNCHNRONIZATION" and insert -- RESYNCHRONIZATION --, therefor.

Signed and Sealed this
Twelfth Day of April, 2016

Michelle K. Lee
*Director of the United States Patent and Trademark Office*